July 27, 1965 P. T. McCAULEY 3,197,697
ELECTRICAL MEASURING SYSTEM FOR MEASURING SELECTED
ONES OF A PLURALITY OF MOMENTARY INPUT SIGNALS
Filed March 2, 1960 3 Sheets-Sheet 1
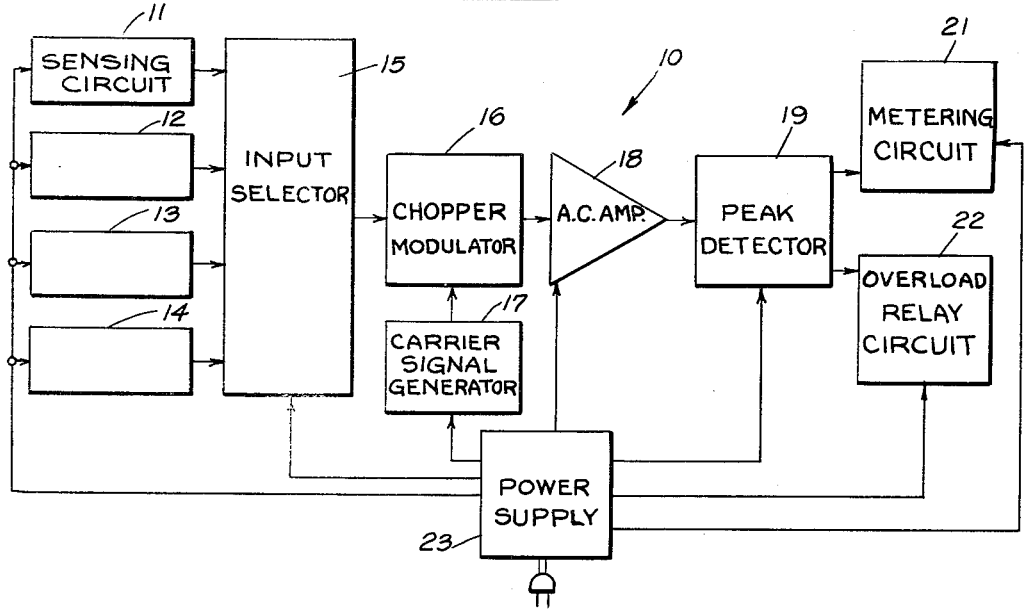
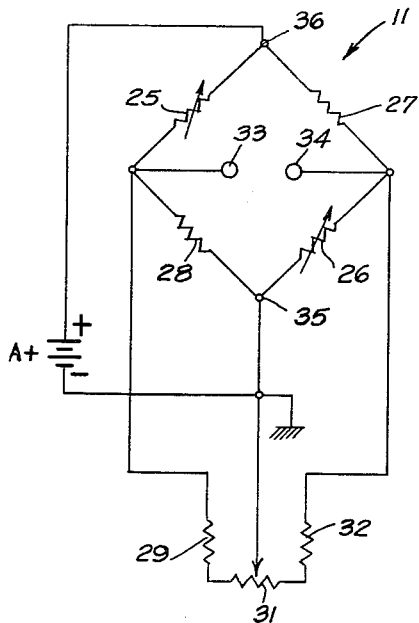
INVENTOR.
PORTER T. McCAULEY
BY

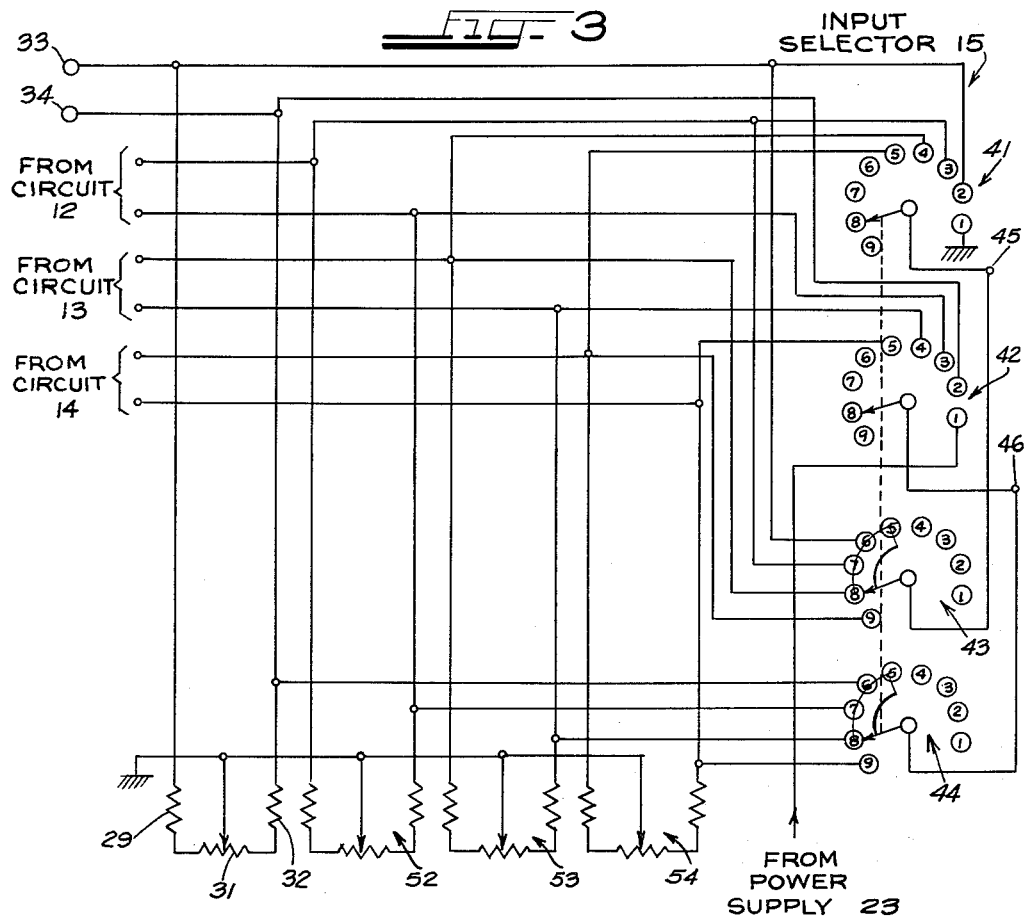
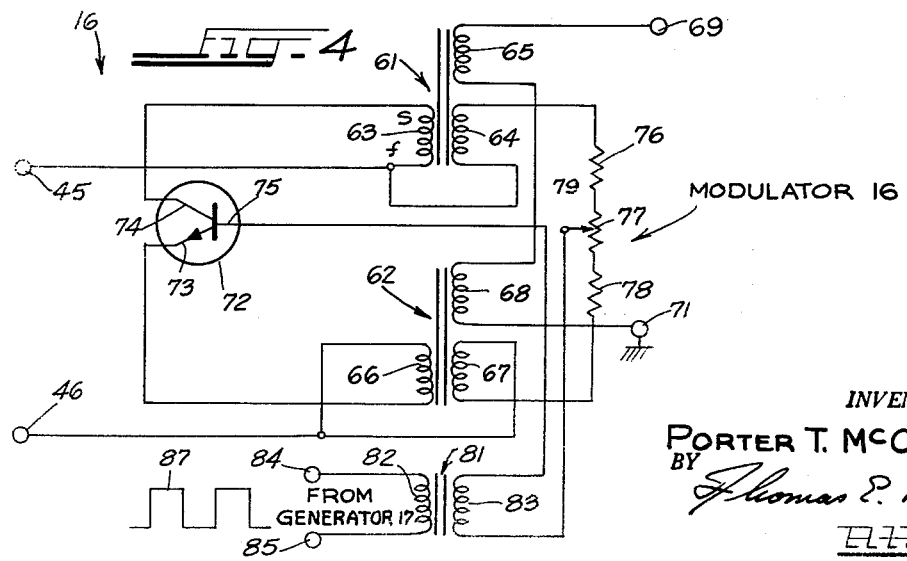

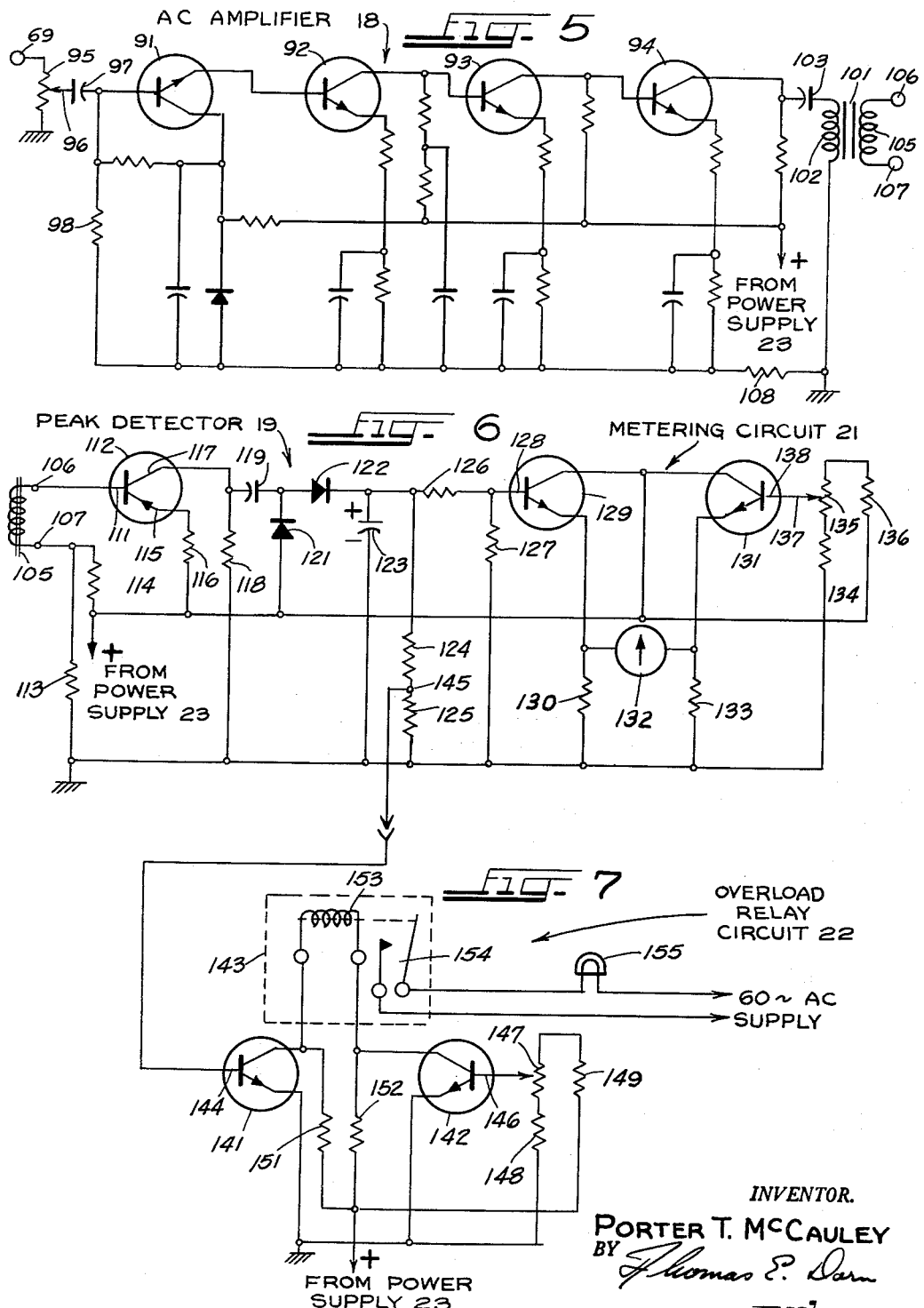

United States Patent Office 3,197,697
Patented July 27, 1965

3,197,697
ELECTRICAL MEASURING SYSTEM FOR MEASURING SELECTED ONES OF A PLURALITY OF MOMENTARY INPUT SIGNALS
Porter Thompson McCauley, Winnetka, Ill., assignor to Microdyne, Inc., Wilmette, Ill., a corporation of Illinois
Filed Mar. 2, 1960, Ser. No. 12,320
2 Claims. (Cl. 324—62)

This invention relates to a new and improved electrical measuring system and also to a new and improved suppressed-carrier amplitude modulator which may be advantageously employed in such a system.

In electrical measuring systems, and particularly strain measuring systems, the sensing elements of the system are frequently incorporated in bridge circuits to provide for thermal compensation. Usually, in previously known systems of this kind, the bridge circuit has been excited by a high-frequency signal. The output signal from the bridge has, in some instances, been applied to a modulation system to afford a means for interpreting changes in the bridge impedance and for calibrating and balancing the bridge. In general, systems of this kind, and particularly those employed for strain measurements, have been relatively complex and expensive. Moreover, in many instances the previously known systems have not afforded output signals of sufficient duration to trigger conventional control devices or to afford a usable direct-reading meter indication to a system operator. Systems of this kind also present difficulties in application where it is desirable to combine to output signals from a plurality of individual sensing bridges; it may sometimes be difficult to effect this combination without substantial distortion of the control signals, resulting in spurious and inaccurate readings.

It is a primary objective of the present invention, therefore, to provide a new and improved electronic measuring system, particularly adapted to strain measurements, which affords an output signal of substantial duration for even very short periods of stress or other measurement periods. It is a related object of the invention to afford a new and improved electronic strain measuring system which gives a control indication lasting for a substantial period of time in response to even a momentary loading of the element or elements subject to stress.

A further object of the invention is to afford a new and improved electrical measuring system which provides for the convenient combination of a plurality of inputs from several different sensing circuits, in any desired combination, without requiring re-calibration of the system or changing of meter scales or relays and without introducing substantial error into operation of the system. A specific and related object of the invention is to provide a new and improved electronic strain gauge system which affords the advantages of A.C. operation but which requires only D.C. excitation of the strain sensing elements, thereby permitting convenient and effective combination of the sensing elements in virtually any desired combination.

An additional object of the invention is to provide a new and improved electronic strain measuring system which is inherently and effectively accurate, which is substantially insensitive to error which might otherwise arise from temperature changes and external noise signals, yet which is simple and economical in construction and operation.

One of the principal features of the present invention is a modulator or chopper circuit which is incorporated in the electronic measuring system. This modulator circuit, although it utilizes only a single transistor and is generally quite simple and economical in construction, affords effective suppressed-carrier modulation using either an A.C. or D.C. input signal for modulation. Furthermore, operation of the modulator can be effected with a carrier signal of virtually any waveform.

Accordingly, it is a further object of the invention to provide a new and improved suppressed-carrier modulator capable of utilizing of either an A.C. or D.C. input signal, and of modulating that signal with a carrier signal of virtually any desired waveform.

Another object of the invention is to provide effective thermal compensation, in an amplitude modulator, over a wide range of operating temperatures without adding substantially to the complexity or cost of the modulator.

A further object of the invention is to provide a new and improved suppressed-carrier amplitude modulator which inherently cancels extraneous noise signals which may be induced within the modulator circuit.

A particular object of the invention is to provide a new and improved chopper or modulator circuit which is relatively simple and inexpensive in construction and requires the use of only one variable impedance element.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the preview of the appended claims.

In the drawings:

FIG. 1 is a block diagram of an electronic measuring system construction in accordance with a preferred embodiment of the invention;

FIG. 2 is a simplified schematic diagram of a substantially conventional bridge circuit which may be utilized in the input to the system;

FIG. 3 is a schematic diagram of a typical selector circuit arrangement which may be employed in the system, and also includes a part of each of a plurality of sensing circuits employed in the system;

FIG. 4 is a schematic diagram of a preferred embodiment of a modulator circuit constructed in accordance with the invention;

FIG. 5 is a schematic diagram of an A.C. amplifier which may be utilized in the invention;

FIG. 6 is a schematic diagram of a peak detector and a control or metering circuit incorporated in the system of FIG. 1; and FIG. 7 illustrates a typical control circuit for the system of FIG. 1.

The electronic strain measuring system 10 illustrated in FIG. 1, which is constructed in accordance with a preferred embodiment of the invention, comprises four individual and independent sensing circuits 11, 12, 13 and 14. Each of the sensing circuits 11, 12, 13 and 14 includes at least one variable resistance sensing element; typically, these sensing elements may be strain gauges of the type described in U.S. Patent No. 2,292,549 to Simmons, Jr. Preferably, the four sensing circuits 11–14 are bridge-type circuits each including at least two individual measuring or sensing elements, a typical circuit of this kind being described hereinafter in connection with FIG. 2.

The sensing circuits 11, 12, 13 and 14 are each individually coupled to an input selector 15. The input selector 15, in turn, is coupled to the input circuit of a chopper or modulator circuit 16. The selector 15, in the preferred embodiment of the invention, may be employed to couple any one of the sensing circuits 11–14 to the modulator 16. In addition, the selector can also be utilized to couple various combinations of the sensing circuits to the input of the modulator. In a typical selector circuit described hereinafter in connection with FIG. 3, the sensing circuits may be coupled to the modulator in a number of different parallel combinations. However, other selector switching arrangements may be utilized to connect the sensing circuits in series with each other in the modulator input circuit, or in series-parallel combinations.

The chopper-modulator 16 is also provided with a second input circuit which is coupled to a carrier signal generator 17. The signal generator 17 may comprise a conventional oscillator or other source of A.C. signals of substantially constant amplitude and frequency, and preferably affords a carrier signal of relatively high frequency of the order of 2 to 25 kilocycles. It is not essential that any particular waveform be utilized for the carrier signal supplied to the modulator 16 from the generator 17. On the other hand, at least some advantage may be obtained in the system of FIG. 1 by utilizing a carrier signal of substantially square waveform, as explained in greater detail hereinafter in connection with FIG. 4.

The output circuit of the chopper-modulator 16 is coupled to an A.C. amplifier 18 which may be substantially conventional in construction. The amplifier 18, in turn, is coupled to a peak detector 19 which is utilized to develop a unipotential output signal representative of the peak value of an applied A.C. signal. Furthermore, the peak detector 19 should have a relatively long time constant so that, in operation, an output signal of sustained amplitude is provided over a substantial period of time despite the fact that the applied signal may attain its peak value only for a relatively short period of time. By way of example, the peak detector 19 may be constructed to afford a discharge or output time constant of the order of ten seconds or more as compared with an input or charge time constant of the order of a second or less. A preferred construction for the peak detector 19 is described hereinafter in connection with FIG. 6. The output stage of the peak detector is coupled to a pair of control circuits, in the system 10, the individual control circuits being identified as a metering circuit 21 and an overload relay circuit 22.

The measuring system 10 of FIG. 1 further includes a power supply 23 which may be energized from a suitable external source, such as a conventional 60-cycle A.C. supply. The power supply 23 is utilized to develop suitable D.C. potentials for operating the carrier signal generator 17, the amplifier 18, the peak detector 19, and the two control circuits 21 and 22. In addition, the power supply 23 is connected to each of the sensing circuits 11–14 and is utilized to apply a unipotential operating voltage to each of these sensing circuits. Provision may also be made for connecting the power supply 23 to the input selector 15 to afford a calibration signal for the chopper-modulator 16. The power supply circuit may be of conventional construction, such as a conventional series-regulated circuit, and may utilize any suitable reference element to control the output voltages as, for example, a zener diode.

In operation, each of the sensing circuits 11–14 is supplied with a D.C. operating voltage from the power supply 23. Preferably, the sensing circuits are constructed and calibrated to afford a negligible output signal voltage under given operating conditions. For example, in a strain measuring system, the sensing circuits may be adjusted for zero output for a condition in which the members being monitored or tested are not subject to stress or are stressed to a predetermined degree. Consequently, each of the sensing circuits develops, as an output signal, a variable D.C. sensing signal which is representative of changes in the resistance of the sensing element included therein and thus representative of the quantity being measured. It is this variable D.C. sensing signal, or a combination of such signals, which is applied to the modulator to modulate the carrier signal supplied from the generator 17.

The modulator 16 develops an A.C. output signal having an amplitude representative of the amplitude of the applied D.C. signal from the selector 15. Of course, this D.C. signal originates with one or more of the sensing circuits 11. The output signal from the modulator has a frequency equal to the frequency of the applied carrier signal. Preferably, the modulator 16 affords an output signal which is directly proportional to the applied D.C. signal and hence is substantially negligible in the absence of an applied D.C. sensing signal. The A.C. signal output from the modulator 16 is amplified, in the circuit 18, and is detected in the detector 19. The output signal from the detector 19 is a D.C. signal having an amplitude which is representative of the peak amplitude of the A.C. signal applied thereto. Furthermore, for any given peak value of applied A.C. signal, the detector 19 produces an output potential which remains essentially constant over a substantial period of time. Consequently, when this signal is applied to the metering circuit 21, ample time is allowed for an operator to observe and interpret the meter reading. Thus, in a strain measuring system, the operator can observe and record an overload or other strain, even though the apparatus subject to strain is only stressed beyond the desired value, or to a given peak value, over a very short period of time. By the same token, the substantial duration of the control signal output from the peak detector 19 provides ample time for actuation of the relay circuit 22, despite the fact that overload conditions may persist only for a very short interval.

The measuring system 10 of FIG. 1 is relatively simple and economical in construction, as is made apparent by the detailed description of typical system components set forth hereinafter in connection with FIGS. 2–7. It provides for convenient combination of sensing signals derived from any one of the sensing circuits or gauges 11–14. Because the sensing circuits are essentially D.C. devices, it is a relatively simple matter to combine their outputs without concern for phase differentials, frequency differences, and other factors which may introduce errors or discrepancies in an A.C.-actuated system. In effect, the electronic measuring system 10 affords all of the advantages of high-frequency A.C. operation without engendering the principal disadvantages of a system of this kind. Furthermore, and as explained hereinafter, the complete system can be effectively and accurately calibrated from the power supply 23, without the use of separate null indicators or other calibration devices, provided only that the power supply be capable of providing calibration signals of known amplitude. Furthermore, the system may be made self-compensating for temperature variations and may also be constructed to provide effective compensation for extraneous noise signals. This latter feature of the invention, which is explained in greater detail hereinafter, is particularly advantageous where the measuring system is utilized in industrial applications, as in strain-measuring apparatus associated with punch presses or other equipment, in environments where the system may be subjected to a variety of different external fields due to the presence of other electrical equipment.

FIG. 2 illustrates a relatively simple Wheatstone bridge sensing circuit, designated as the sensing circuit 11 but which may be considered to represent any one of the individual sensing circuits 11–14. The sensing circuit 11 comprises a pair of variable resistance sensing elements 25 and 26 connected in the bridge circuit with a pair of fixed resistors 27 and 28. The sensing elements may be strain gauges constructed in accordance with the aforementioned Simmons patent. Preferably, the bridge is provided with a suitable balancing network, comprising three resistors 29, 31 and 32 which are connected in series with each other across the output terminals 33 and 34 of the bridge. The intermediate resistor 31 of the balancing network comprises a potentiometer, the variable tap on the potentiometer being returned to the system ground. Excitation for the bridge is provided by a suitable D.C. source connected across the bridge terminals 35 and 36, and represented in FIG. 2 by the battery A+. In actual practice, the bridge is excited from the power supply 23 (see FIG. 1). By adjusting the potentiometer 31, the sensing bridge circuit 11 can be brought into substantially exact balance for D.C., thereby providing effective compensation for individual differences between the sensing resistors or gauges 25 and 26 and other similar factors. The use of the bridge circuit may also provide effective compensation for thermal variations of the sensing elements. The output signal across the terminals 33 and 34 is a variable D.C. signal representative of changes in the resistance of the sensing elements 25 and 26, this signal being referred to hereinafter as the sensing signal.

FIG. 3 illustrates a typical circuit which may be utilized for the input selector 15, together with portions of the individual sensing circuits 11–14. The selector circuit 15, as illustrated in FIG. 3, may comprise four rotary selector switches 41, 42, 43 and 44 each having nine individual operating contacts. The four selector switches are ganged for concurrent operation. The selector switches 41 and 42 are of the individual-contact type; that is, the wiper arm of each switch makes contact with only one of the switch terminals at any given time. The rotary selectors 43 and 44, on the other hand, are of the multiple-contact type, the wiper element in each instance comprising an arcuate contact member which engages a plurality of individual selector switch contacts. In the illustrated arrangement, each of the selector stages 43 and 44 provides for contact with four individual input terminals at any given time. The wiper arms of the rotary selector switch stages 41 and 43 are connected to each other and to an output terminal 45. The other output terminal 46 of the selector is connected to the wiper arms of the rotary selector stages 42 and 44.

The output terminal 33 of the first sensing circuit 11 (see FIGS. 1 and 2) is connected to the second contact on the rotary selector switch 41. In addition, the sensing circuit output terminal 33 is also connected to the sixth contact of the selector switch 43. The other output terminal 34 of the circuit 11, on the other hand, is connected to the second contact of the selector switch 42 and to the sixth contact of the selector switch 44. The balancing network for the sensing circuit 11, comprising the resistors 29, 31 and 32, is also shown in FIG. 3 to assist in correlating this figure with the diagram of the sensing circuit, FIG. 2.

FIG. 3 also shows the output terminals for the sensing circuits 12, 13 and 14 and the balancing circuits 52, 53 and 54 for bridges 12, 13 and 14, respectively. One of the output terminals of the sensing circuit 12 is connected to the third contact of the rotary selector 41 and to the seventh contact of the selector 43. The other output terminal from the sensing circuit 12 is connected to the third contact of the selector stage 42 and to the seventh contact of the selector stage 44. One of the output terminals from the sensing circuit 13 is connected to the fourth contact of the switch 41 and to the eighth contact of the switch 43; the other output terminal from the circuit 13 is connected to the fourth contact of the switch 43 and to the eighth contact of the switch 44. One of the output terminals of the circuit 14, on the other hand, is connected to the fifth and ninth contacts of the switches 41 and 43, respectively, the other output terminal from this sensing circuit being connected to the fifth and ninth contacts, respectively, of switches 42 and 44. The initial contact of the selector switch 41 is connected to the system ground, whereas the first contact of switch 42 is connected back to the power supply 23.

Operation of the input selector 15 is relatively simple, and is representative only of any one of a wide variety of switching arrangements which may be utilized to couple the sensing circuits 11–14 to the modulator 16 in the electronic measuring system 10 (see FIG. 1). Thus, referring to FIG. 3, it may be assumed that the ganged selector switches 41–44 are actuated to their second position, engaging the wiper arm of the selector with the number two contact in each of the selector switches. When this is done, the output terminals 45 and 46 of the selector are directly connected to the output terminals 33 and 34 of the sensing circuit 11. Furthermore, there is no effective coupling circuit established between the terminals 45 and 46 and the output terminals of any of the other sensing circuits. Thus, with the selector 15 in its second operating position, only the sensing circuit 11 is effective to control operation of the electronic measuring system. Similarly, positions 3, 4 and 5 of the selector may be utilized to connect the sensing circuits 12, 13 and 14, respectively, to the modulator of the control system on an individual basis.

When the selector is moved to its sixth contact position, the sensing circuit 11 is again individually connected to the output terminals 45 and 46, this redundant position being employed because it simplifies the parallel-circuit connections described hereinafter. When the ganged selector switches are actuated to their seventh operating position, the two sensing circuits 11 and 12 are connected in parallel with each other to the output terminals 45 and 46. By advancing the selector to its eighth position, the sensing circuits 11, 12 and 13 are all connected in parallel with each other to the output terminals of the selector. In the ninth operating position, all four of the sensing circuits are connected in parallel with each other to the output terminals 45 and 46. Of course, other combinations may be effected by relatively minor changes in the connections to the rotary switches 41–44, depending upon the number of sensing circuits in the system and the combinations of sensing circuits which may be desirably connected, in a given application, to the selector output terminals. In fact, by utilizing a series of individual toggle switches requiring separate actuation by the system operator, any desired combination of sensing circuits, in series or parallel, may be connected to the selector output terminals 45 and 46, as will be apparent to those skilled in the art.

The first operating position for the selector 15 is reserved for calibration purposes. Thus, and as noted hereinabove, power supply 23 is preferably constructed to afford a low level D.C. calibration signal of constant amplitude, within the operating range of the sensing circuits. The connection to the initial contact of the selector switch 42, from the power supply 23, makes it possible to apply this calibration signal directly to the input of the modulator 16 simply by actuating the selector 15 to its first operating position. That is, the calibration or test signal can be applied directly across the terminals 45 and 46, which comprise the output terminals for the selector and the input terminals for the modulator, to test operation of the measuring system.

The use of the selector 15, and the provision for connecting the individual sensing circuits or bridges 11–14 in parallel is of particular advantage because, when the bridges are connected in parallel, the output of each bridge is effectively reduced in direct proportion to the number of bridges connected in parallel. Thus, if each of the bridges 11–14 affords an output signal of one millivolt, and two of the bridges are connected in parallel, as by moving the selector 15 to its seventh contact position, the two bridges each afford an effective output of ½ millivolt at the terminals 45 and 46. The sum of the two signals received from the two bridges is thus, again, one millivolt. As a practical matter, this permits the operator to examine the output from each bridge, individually, on a 0–100% scale. When several bridges are connected in parallel, the output is reduced proportionally, so that the sum signal is still readable upon the same meter scale without alteration of system gain. Consequently, the parallel connection arrangement provided by the selector mechanism, such as the selector 15, makes it unnecessary to adjust the system gain for plural bridge readings and also protects any meter used in the system against excessive loading.

FIG. 4 illustrates a preferred embodiment of the modulator 16; this particular modulator circuit comprises one of the important features of the invention. As shown in FIG. 4, the modulator 16 comprises a pair of transformers 61 and 62. The transformer 61 includes a first primary winding 63, a second primary winding 64, and a secondary or output winding 65. The transformer 62 is similar in construction and includes first and second primary windings 66 and 67 and a secondary winding 68. The two secondary windings 65 and 68 are connected in series with each other to afford an output circuit for the modulator, the output terminals of the modulator being identified by the reference numerals 69 and 71. The terminal 71 in this instance is connected to the system ground.

The modulator circuit 16 includes a first coupling circuit which intercouples the first primary windings 63 and 66 of the transformers 61 and 62 in series with each other across the input terminals 45 and 46 of the modulator. This coupling circuit includes a variable impedance device, responsive to an applied signal, which is connected in series between the two windings. In the embodiment illustrated in FIG. 4, the variable impedance device comprises a transistor 72 having an emitter electrode 73, a collector electrode 74, and a base electrode 75. The transistor 72 is connected to the coupling circuit between the two primary windings with its emitter-collector conduction path in series in this circuit. That is, the emitter 73 is connected to one end of the winding 66, and the collector 74 is connected to one end of the winding 63. The circuit connection between the two windings 63 and 66 is such that, when a signal is applied to the input terminals 45 and 46, and hence to the first primary windings, the resulting signals induced in the two secondary windings 65 and 68 of the output circuit are in series aiding relationship. Stated differently, the two windings 63 and 66 are connected in phase with each other insofar as the output circuit is concerned.

The second set of primary windings, comprising the windings 64 and 67, is also provided with a coupling circuit which couples the two windings in series with each other across the input terminals 45 and 46. This second coupling circuit, in this instance, comprises three resistors 76, 77 and 78, connected in series with each other in the order named between the windings 64 and 67. The resistor 77 is preferably a potentiometer, being provided with an adjustable tap 79. This second coupling circuit is connected to the second set of primary windings in a manner such that the winding 64 is effectively connected in phase opposition to the associated first primary winding 63 of the transformer 61, the primary winding 67 similarly being connected in phase opposition to the associated first primary winding 66 in the transformer 62. Consequently, the windings 64 and 67 are effectively connected in series-aiding relation with respect to each other, insofar as the output circuit comprising the secondary windings 65 and 68 is concerned; that is, signals applied to the windings 64 and 67 through the coupling circuit connecting these windings to the input terminals 45 and 46 tend to produce an output signal across the output terminals 69 and 71 because the signals induced in the windings 65 and 67 are in phase relative to each other.

The modulator 16 further includes means for applying a carrier signal to the variable impedance device comprising the transistor 72 and to the coupling circuit for the primary windings 64 and 67, the latter connection preferably being made to the approximate electrical center of the second coupling circuit through the variable tap 79 on the potentiometer 77. In the embodiment of FIG. 4, this carrier signal input means comprises a third transformer 81 having a primary winding 82 and a secondary winding 83. The primary winding is provided with input terminals 84 and 85 which couple the primary windings to the carrier signal generator 17. One side of the secondary winding 83 is connected to the base electrode 75 of the transistor 72. The other side of the secondary 83 is connected to the variable tap 79 on the potentiometer 77.

In operation, a high-frequency carrier or drive signal is applied to the input terminals 84 and 85 of the modulator 16, this signal being supplied from the generator 17. The drive signal is coupled to the modulator through the coupling transformer 81, as noted hereinabove. When the polarity of the applied carrier signal is such that the base electrode 75 of the transistor 72 is driven positive with respect to the emitter and collector electrodes 73 and 74, both junctions of the transistor are biased in the forward direction, the transistor in this instance being a NPN device. It will be recognized by those skilled in the art that a PNP transistor could be substituted for the transistor 72, in which case the operating effects described herein are reversed with respect to the polarity of the drive signal. When the base 75 is driven positive, relative to the emitter and collector, the transistor is essentially saturated. Consequently, the resistance in the emitter-collector path of the transistor is very low. Initially, the effect of both the carrier current and the signal current on the modulator may be considered on the basis of this operating condition.

The drive current from the transformer secondary 83 flows from the base electrode 75 through the collector 74 and the winding 63 of the transformer 61. The direction of current flow through the winding 63 may be taken as the "start-to-finish" direction. This same current subsequently flows through the other or second primary winding 64 of the same transformer, but in this instance current flow is in a finish-to-start direction. That is, the current through the two windings 63 and 64 is effectively in phase opposition, with the result that the net signal induced in the winding 65 is essentially negligible, the windings 63 and 64 being substantially identical in construction. The same action occurs in the emitter circuit of the transistor 72. That is, the drive or carrier current flows from the emitter 73 through the first primary winding 66 of the transformer 62 and then through the second primary winding 67 of this transformer. Since the windings 66 and 67 are connected in effective phase opposition with respect to each other, no significant output signal is developed in the secondary winding 68 of the transformer. It is thus seen that the carrier or drive signal applied to the input terminals 84 and 85 does not produce an output signal in the output circuit of the modulator, comprising the transformer windings 65 and 68, or at least produces no significant output signal, in the absence of any input signal at the terminals 45 and 46.

When a signal is applied to the input terminals 45 and 46, the conduction path for the applied signal, starting at terminal 45, extends through the winding 63 in a finish-to-start direction, through the low-resistance of the saturated transistor 72, and through the winding 66. The direction of current flow in the winding 66 is also from finish to start. Consequently, an output signal is induced in the secondary windings 65 and 68 of the transformers 61 and 62, the induced signals in the two windings being in series-aiding relationship.

There is also a parallel conduction path, starting from the terminal 45, which extends through the winding 64, the resistors 76–78, and the winding 67 to the other terminal 46. Since the primary windings 64 and 67 are connected in opposite polarity to the windings 63 and 66, the current induced in the output windings 65 and 68 as a result of current flow through the windings 64 and 67 is opposite in polarity to that induced by the signal current in the windings 63 and 66. Thus, this second induced current effectively subtracts from the output signal. However, because the signal current is divided between the two conduction paths through the two transformers in inverse proportion to their impedances, virtually all of the signal current flows through the low resistance afforded by the transistor 72 rather than through the coupling circuit comprising the resistors 76–78. As pointed out hereinafter, the total resistance of the members 76–78 may, for example, be of the order of 20 kilohms, whereas the effective resistance of the emitter-collector path through the transistor 72, when saturated, is usually of the order of 5 to 10 ohms.

On the next half-cycle of the carrier current applied to the input terminals 84 and 85, the transistor 72 is effectively reverse-biased at both junctions. Consequently, the resistance between the base and the collector and emitter of the transistor becomes, in each instance, of the order of several megohms. Leakage current flowing across the reverse-biased junctions follows the same path as the drive current, as described hereinabove, and produces a net output of zero in the secondary windings 65 and 68 in the absence of an applied signal.

If it is assumed that a D.C. input signal is still applied across the input terminals 45 and 46, it is seen that the current through the windings 63 and 66 must traverse a conduction path which includes several megohms of resistance in the emitter-collector path of the transistor 72. Through the alternate circuit, comprising the windings 64 and 65 and the impedances 76–78, the series impedance is much smaller and may, for example, be the order of 20 kilohms. Consequently, practically all of the signal current flows through the second set of primary windings 64 and 67. The minimal current which flows in the first set of primary windings 63 and 66, in this instance, effectively subtracts from the principal induced current in the output circuit, caused by the current flow through the windings 64 and 67. Of course, under these conditions, the polarity of the induced signal in the output circuit is opposite to that afforded when the transistor 72 is forward-biased, as described hereinabove. It is thus seen that, in the presence of a D.C. input signal across the terminals 45 and 46, an A.C. output signal is induced in the circuits 69–71, this A.C. output signal having an amplitude representative of the amplitude of the D.C. signal applied to the input terminals 45 and 46 and having a frequency equal to the frequency of the carrier signal applied to the input terminals 84 and 85. Stated differently, the modulator 16 functions as a suppressed-carrier amplitude modulator to develop an output signal having a fundamental frequency equal to the frequency of the applied carrier signal and an amplitude representative of, and actually directly proportional to, the amplitude of the applied D.C. input signal.

From the foregoing description, it may be seen that the drive current, or carrier current, and the leakage current from the transistor junctions each act as self-cancelling agents. That is, the leakage current can change, the drive current can vary, and the decay of current flow through the two junctions of the transistor can change without causing the development of an output signal in the output windings 65 and 68 of the modulator. To the extent that cancellation is accomplished in the transformers 61 and 62, changes in reverse current and forward current in the transistor have no effect upon the output signal. Consequently, the modulator 16 operates substantially independently of temperature induced drift or other changes in the operating characteristics of the transistor 72. By the same token, noise signals induced in the primary windings of the modulated transformers are effectively cancelled.

In the electronic strain gauge system 10 of FIG. 1, it is preferred that the input signal applied to the terminals 84 and 85 be of substantially square waveform, as indicated by the curve 87 in FIG. 4. A convenient and inexpensive signal generator, which may be employed for this purpose, as the carrier signal generator 17, is a conventional free-running transistor multi-vibrator. However, other suitable signal sources may also be employed; for example, the signal generator could readily be constructed as a conventional oscillator provided a sinusoidal output signal, followed by a clipper stage to reduce the signal to substantially square waveform. A square wave is desirable, in this instance, to effect rapid transition between saturation and cut off in the transistor 72, rendering the modulator independent of changes in the operating characteristics of the transistor due to aging, temperature drift, or the like.

The modulator 16 does not require the use of a square wave input, however, but may be operated quite effectively with an input signal of sinusoidal form or virtually any other carrier input waveform. Furthermore, it is not essential that the transistor 72 be operated as a switch, as described hereinabove, being driven from a saturated condition to cut-off on alternate half cycles of the applied carrier signal. Rather, the circuit of FIG. 4 may be operated as a true modulator, with an A.C. signal applied to the input terminals 45 and 46 instead of the D.C. signal used in the system of FIG. 1, limiting the carrier current to the linear portion of the transistor operating characteristic. Under these conditions, the output signal developed across the terminals 69 and 71 is a direct amplitude-modulated signal, including the sum and difference frequencies of the two applied signals, with the carrier suppressed. In practice, carrier suppression ratios of the order of 95 db are easily obtained. Furthermore, although the modulator 16 is most advantageous, with respect to simplicity of construction and efficiency of operation, using a transistor such as the transistor 72 as the principal control element, many of the advantages of the circuit can be obtained with a different control arrangement. Thus, the transistor 72 may be replaced by some other form of variable impedance device which can be actuated between a low-impedance and high-impedance condition in response to an applied signal. For example, the transistor 72 may be replaced by a pair of diodes connected in back-to-back series with each other between the windings 63 and 66, the connection from the carrier input transformer winding 83 being made to the junction between the two diodes.

FIG. 5 illustrates, in substantial detail, a suitable A.C. amplifier which may be utilized as the amplifier 18 in the system of FIG. 1, being coupled to the output terminal 69 of the modulator 16 (see FIG. 4). Thus, and as shown in FIG. 5, the A.C. amplifier 18, in this instance, comprises four stages including, respectively, the transistors 91, 92, 93 and 94. The input circuit to the first stage of the amplifier, comprising the transistor 91, includes a potentiometer 95 having one end connected to the terminal 69, the other end of the potentiometer being returned to the system ground. The variable tap 96 on the potentiometer is coupled, by means of a coupling capacitor 97 and an input resistor 98, to the base electrode of the transistor 91, the resistor 98 being returned to system ground. The first stage of the amplifier is an emitter follower, the emitter of the transistor 91 being coupled to the base electrode of the second stage transistor 92. The remaining stages of the amplifier are substantially conventional common-emitter circuits. The requisite biasing potentials for the individual amplifier stages are provided by a suitable connection to this power supply 23.

The output circuit for the final stage of the amplifier 18 comprises an output transformer 101 having a primary winding 102 that is coupled by a capacitor 103 to the collector of the fourth stage transistor 94. The secondary or output winding 105 of the transformer 101 is connected to a pair of output terminals 106 and 107 which comprise the input terminals of the peak detector 19, as described hereinafter in connection with FIG. 6. The end of the primary winding 102 not coupled to the capacitor 103 is returned to the system ground. Preferably, a feedback resistor 108 is interposed in the emitter circuit of each of the amplifier stages comprising the transistor 92, 93 and 94, and in the base circuit of the transistor 91. Inasmuch as the amplifier 18 is substantially conventional in construction and in operation, no detailed description of the operation is deemed necessary herein.

FIG. 6 shows a typical operating circuit for the peak detector 19 and the metering circuit 21 of the measuring system 10 of FIG. 1. As shown therein, the input stage of the peak detector 19 comprises the secondary winding 105 of the coupling transformer 101 (see FIG. 5). One input terminal 106 to the peak detector is connected to the base electrode 111 of a transistor 112. The other input terminal 107 is connected to the center of a voltage divider comprising a pair of resistors 113 and 114. The resistor 113 is returned to the system ground, whereas the resistor 114 is connected to a suitable postive-polarity D.C. supply, in this instance a part of the power supply 23. Thus, a positive bias is provided for the base electrode 111 of the transistor 112.

The emitter electrode 115 of the transistor 112 is returned to the positive polarity supply through a resistor 116. The collector 117, on the other hand, is returned to system ground through a resistor 118. The collector 117 is also connected to a capacitor 119, the other terminal of the capacitor being connected to a diode 121 which is returned to the positive polarity supply. The capacitor 119 is also coupled to anode of a second diode 122, the cathode of the diode 122 being coupled to a storage capacitor 123 that is returned to ground. A D.C. ground return circuit for the diode 122 is provide through a pair of resistors 124 and 125 which are connected in series with each other. Furthermore, the cathode of the diode 122 is also returned to ground through a parallel circuit comprising a pair of resistors 126 and 127 connected in series with each other, the common terminal of the two resistors being connected to the base electrode 128 of a transistor 129 that is incorporated in the metering circuit 21.

In addition to the transistor 129, the metering or control circuit 21 includes a second transistor 131, the two transistors 129 and 131 being incorporated in substantially identical emitter follower circuits to drive a conventional indicating meter 132. Of course, a recording meter may also be utilized if desired. Thus, the electrodes of the transistors 129 and 131 are connected to each other and are returned directly to the positive-polarity voltage supply line. The emitter electrodes of the transistors 129 and 131 are returned to the system ground through the resistors 132 and 133 respectively. The meter 132 is connected directly across the two emitter electrodes. The input circuit to the transistor 131 comprises a voltage divider including three resistors 134, 135 and 136 which are connected in series with each other between the positive polarity power supply and ground. The resistor 135 is constructed as a potentiometer, the variable tap 137 on the potentiometer being connected to the base electrode 138 of the transistor 131.

With respect to operation of the peak detector 19 and the metering circuit 21, as shown in FIG. 6, it may be considered that the transistor 112 functions as a conventional amplifier. That is, the circuit comprising the transistor 112 is essentially a continuation of the A.C. amplifier of FIG. 5. The peak detector itself comprises the two rectifiers 121 and 122, the capacitor 123, and the resistors 124 and 126, these two resistors being relatively large as compared with the additional resistance 125 and 127 in the parallel output circuits of the detector. In operation, the two diodes 121 and 122 function as a voltage-doubling half-wave rectifier, the diode 121 being returned to the positive supply to provide bias to the two output transistors 129 and 131. When an A.C. signal is applied to the detector, from the output circuit of the amplifier transistor 112, the capacitor 123 is charged through the half-wave rectifier formed by the two diodes. The charge polarity is as indicated in the drawing. It should be noted that the charging circuit is a relatively low-impedance circuit. The capacitor 123, is, of course, charged to the peak value of the received A.C. signal. The discharge path for the capacitor, on the other hand, is through the two resistive circuits comprising the resistors 124 and 126. These resistors are relatively large, each being preferably of the order of at least one megohm. In a typical circuit, the impedance values and other parameters of which are set forth in detail hereinafter, the charging time constant for the capacitor 123 may be of the order of 0.75 milliseconds, but the discharge time constant is in excess of 10 seconds. Consequently, the peak voltage is maintained across the capacitor 123 for an appreciable period of time, even though only a very brief charging signal is applied to the capacitor. This differential between the two time constants is highly desirable because it effectively provides for a sustained reading at the meter 132 even though the applied signal, representative of a quantity being measured, is of only very brief duration. This is of particular importance in strain measuring systems, where the applied stress and resultant strain may be of very short duration.

As noted hereinabove, the two transistors 129 and 131 are connected as emitter followers. This is done to provide a low-impedance drive source for the meter 132, affording excellent dampening action. The adjustable input circuit for the transistor 131 is provided to permit convenient adjustment of the meter to an accurate "zero" or other calibration reading. The illustrated circuit is effective to eliminate temperature-dependent drift to a substantial extent, error from this source being virtually completely eliminated when the transistors 129 and 131 are matched with respect to temperature variable characteristics. That is, the two transistors offset each other, with respect to drift effects, because they are both exposed to the same environment and are similarly connected in circuit with the meter 132.

As noted hereinabove in connection with the description of FIG. 1, the measuring system 10 shown therein includes two control devices, comprising the metering circuit 21 and the overload relay circuit 22. The overload relay circuit is illustrated in FIG. 7, and comprises a pair of transistors 141 and 142. These two transistors are connected in essentially similar circuits and are utilized to actuate a control relay 143. Thus, the base electrode 144 of the transistor 141 is connected to the common terminal 145 of the resistors 124 and 125 in the output circuit of the peak detector 19 (see FIG. 6). The base electrode 146 of the second transistor 142 is connected to a biasing circuit including a potentiometer 147 connected in series with a pair of resistors 148 and 149 between the positive polarity power supply and ground.

The emitters of the two transistors are each returned to system ground. The collector of the transistor 141 is connected to the positive polarity power supply through a load resistor 151, whereas a similar resistor 152 is connected in the collector circuit of the transistor 142. The operating coil 153 of the overload relay 143 is connected between the collectors of the two transistors. The relay 143 may be of conventional construction, and may be provided with any desired contact arrangement, only one set of contacts 154 being shown in FIG. 7. If desired, an indicator light 155 may be connected in the overload relay circuit to afford an indication to the operator that the overload relay has been tripped.

From the foregoing description, it will be seen that the overload relay circuit 22 is similar in many respects to the other control circuit of the system, the metering circuit 21. Thus, the base electrode 144 of the transistor 141 is normally maintained at a relatively low positive potential by virtue of the connection back to the voltage divider 124, 125 in the peak detector circuit, FIG. 6. As shown in FIG. 7, the base electrode 146 of the second transistor 142 can be adjusted to afford a balanced condition in the relay circuit, maintaining the relay in a normally unactuated condition. Whenever an input signal of predetermined amplitude is applied to the control electrode 144 from the peak detector 19, however, the resulting output signal from the transistor 141 is effective to actuate the relay 143, by energizing the coil 153. The overload relay, may of course, be connected in any suitable external control circuit to interrupt operation of a machine or to perform such other control function as may be desired. The potentiometer 147 affords a convenient and effective means for adjusting the D.C. voltage applied to the transistor 142 in order to adjust the trip-out point of the relay 143.

In order to afford a more complete illustration of a typical embodiment of the present invention, certain data with respect to circuit parameters and elements are set forth in detail hereinafter, particularly with respect to the circuits illustrated in FIGS. 4–7. It should be understood, however, that these data are presented merely by way of illustration and in no sense as a limitation upon the invention.

Control devices

| | |
|---|---|
| Transistor 72 | Type 2N594. |
| Transistor 91–94 | Type J–510. |
| Transistor 117 | Type 2N1042. |
| Transistors 129, 131 | Type J–507. |
| Transistors 141, 142 | Type J–510. |
| Diodes 121, 122 | Type 1N482A. |

Resistors

| | |
|---|---|
| Resistors 76, 78 | 5.6 kilohms. |
| Resistor 77 | 10 kilohms. |
| Resistor 95 | 50 kilohms. |
| Resistor 98 | 470 kilohms. |
| Resistor 108 | 1 ohm. |
| Resistor 113 | 5.7 kilohms. |
| Resistor 114 | 47 ohms. |
| Resistor 116 | 2.2 ohms. |
| Resistor 118 | 75 ohms. |
| Resistor 124 | 3.3 megohms. |
| Resistors 125, 127 | 100 kilohms. |
| Resistor 126 | 1.2 megohms. |
| Resistors 132, 133 | 2.2 kilohms. |
| Resistor 134 | 100 kilohms. |
| Resistor 135 | 10 kilohms. |
| Resistor 136 | 1.5 megohms. |
| Resistor 147 | 250 kilohms. |
| Resistor 148 | 820 kilohms. |
| Resistor 149 | 1 megohm. |
| Resistors 151, 152 | 33 kilohms. |

Capacitors

| | Microfarads |
|---|---|
| Capacitors 97, 119 | 100 |
| Capacitor 103 | 35 |
| Capacitor 123 | 10 |

Voltage supply

| | Volts |
|---|---|
| D.C. Supply, FIG. 2 | 15 |
| D.C. Supply, FIGS. 5–7 | 30 |

The measuring system of the invention, particularly as applied to strain measurement applications, is relatively simple and economical, as compared with most previously known systems, yet provides highly accurate measurements. With respect to the use of indicating instruments, such as the meter 132, the relatively long period of time over which a sustained meter reading is presented is particularly advantageous, since it enables the operator to read and interpret the meter indication with substantial accuracy. The system provides for convenient combination of measurements from a variety of individual gauges or sensing circuits, in virtually any desired combination. In effect, the measuring system combines the advantages of high frequency A.C. operation with the convenience and flexibility of a D.C. input system.

The modulator circuit of FIG. 4 is particularly advantageous in the system of FIG. 1, and also affords substantial advantages as compared with other known suppressed-carrier amplitude modulator circuits. The modulator effectively provides for cancellation of noise signals which may be induced therein from external fields, and also is effective to compensate for any variations in operating characteristics of the modulator control element which may result from temperature variations or other sources. The modulator is quite simple and inexpensive in construction and affords a relatively high degree of attenuation of the carrier signal in the output.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. An electrical strain measuring system comprising: a plurality of sensing circuits each including at least one variable resistance sensing element; means for applying a unipotential operating voltage to each of said sensing circuits to develop, in each of said sensing circuits, a variable D.C. sensing signal representative of changes in the resistance of the sensing element thereof; selector means for coupling said sensing circuits, individually and in a plurality of different combinations, to a single output circuit; a source of A.C. signals of substantially constant amplitude and frequency; modulator means having two input circuits individually coupled to said A.C. source and to said output circuit, for generating an A.C. output signal having an amplitude representative of the amplitude of an applied D.C. signal from said output circuit and a frequency equal to the frequency of the applied A.C. signal; a peak detector, coupled to said modulator means, for developing a substantially unipotential control signal representative of the amplitude of said A.C. output signal, and a control circuit coupled to said peak detector for actuation by said control signal.

2. An electrical strain measuring system comprising: a plurality of bridge-type sensing circuits each including at least one variable resistance sensing element; means for applying a unipotential operating voltage of substantially constant amplitude to each of said sensing circuits to develop, in each of said sensing circuits, a variable D.C. sensing signal representative of changes in the resistance of the sensing element thereof; selector means for coupling said sensing circuits, individually and in a plurality of different combinations, to a single output circuit; a source of A.C. signals of substantially constant amplitude and frequency; modulator means having two input circuits individually coupled to said A.C. source and to said output circuit, for generating an A.C. output signal having an amplitude directly proportional to the amplitude of an applied D.C. signal from said output circuit and a frequency equal to the frequency of the applied A.C. signal, said A.C. output signal being essentially negligible in the absence of an applied D.C. signal; a peak detector, coupled to said modulator means, for developing a substantially unipotential control signal representative of the amplitude of said A.C. output signal, said detector having a relatively long time constant; and a control circuit coupled to said peak detector for actuation by said control signal.

(References on following page)

References Cited by the Examiner

UNITED STATES PATENTS

| | | | |
|---|---|---|---|
| 2,476,496 | 7/49 | Kliever | 324—61 X |
| 2,531,145 | 11/50 | Marco et al. | 324—62 |
| 2,536,022 | 1/51 | Beach et al. | 324—62 |
| 2,564,829 | 8/51 | Bedford et al. | 324—111 X |
| 2,567,575 | 9/51 | Olson | 324—62 |
| 2,844,798 | 7/58 | Squires | 332—44 |
| 2,870,414 | 1/59 | Isley | 332—44 |
| 2,883,618 | 4/59 | Nuut | 324—62 X |

FOREIGN PATENTS

| | | |
|---|---|---|
| 1,021,435 | 2/53 | France. |
| 601,877 | 5/48 | Great Britain. |

WALTER L. CARLSON, *Primary Examiner.*
LLOYD McCOLLUM, *Examiner.*